(No Model.) 3 Sheets—Sheet 1.
L. A. ASPINWALL.
POTATO PLANTER.
No. 276,994. Patented May 8, 1883.
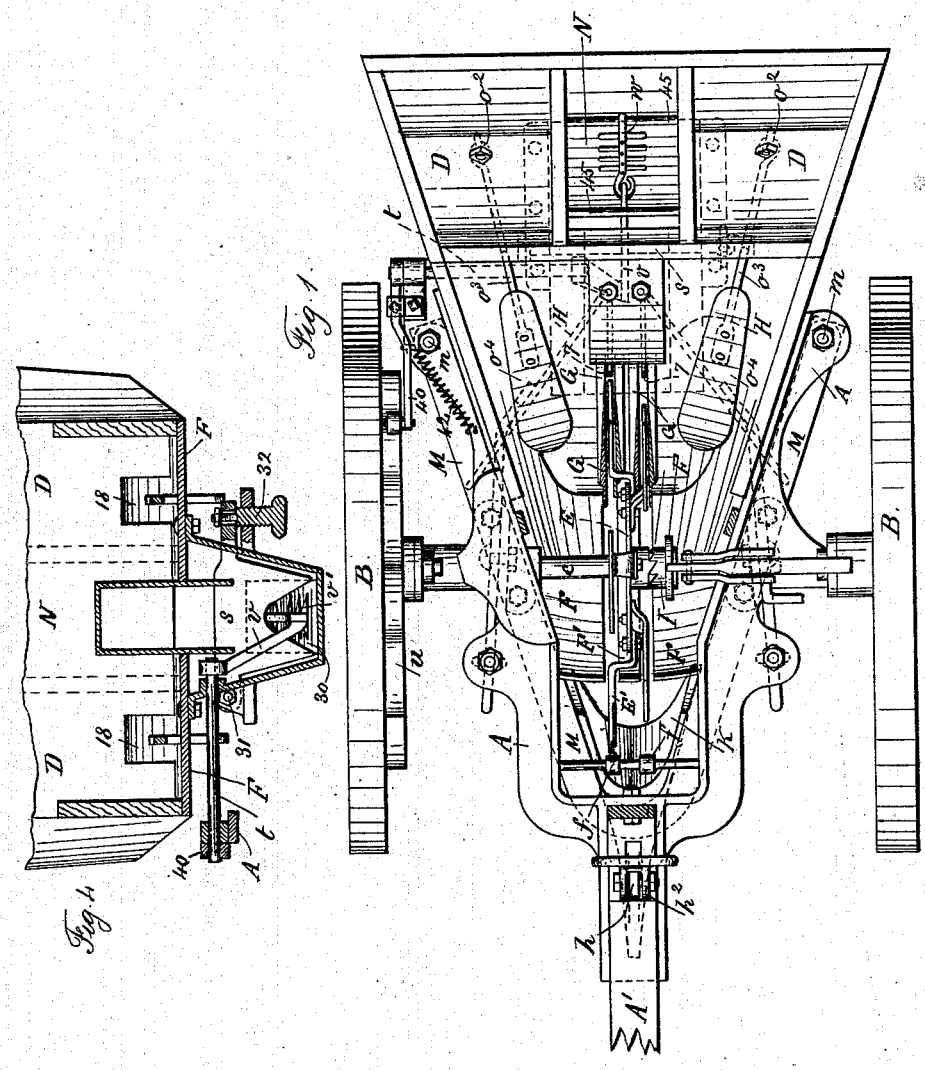
Witnesses
J. Haib
Chas H Smith
Inventor
Lewis Augustus Aspinwall
per Lemuel W. Serrell atty

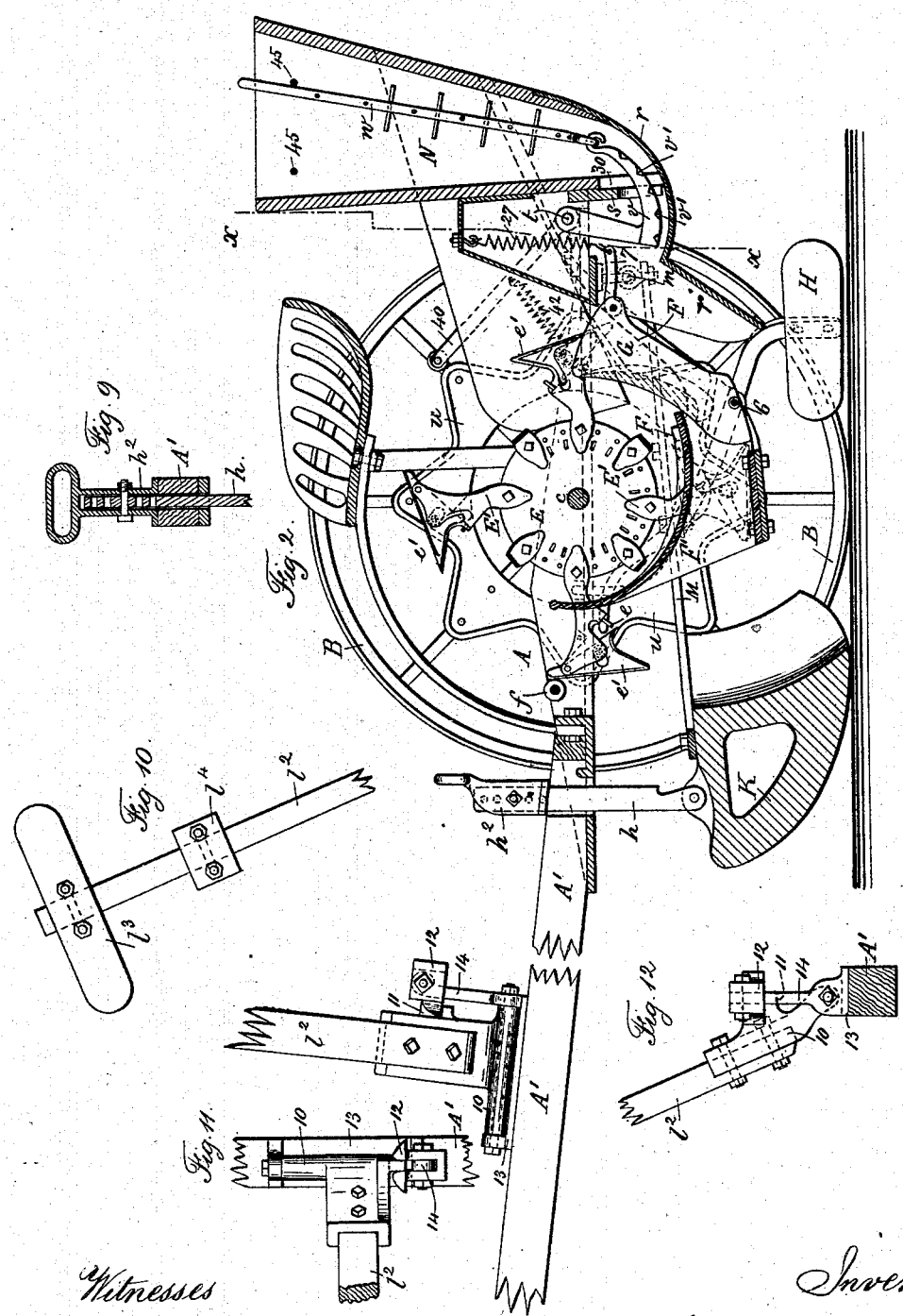

(No Model.)   L. A. ASPINWALL.   3 Sheets—Sheet 3.
POTATO PLANTER.
No. 276,994.   Patented May 8, 1883.
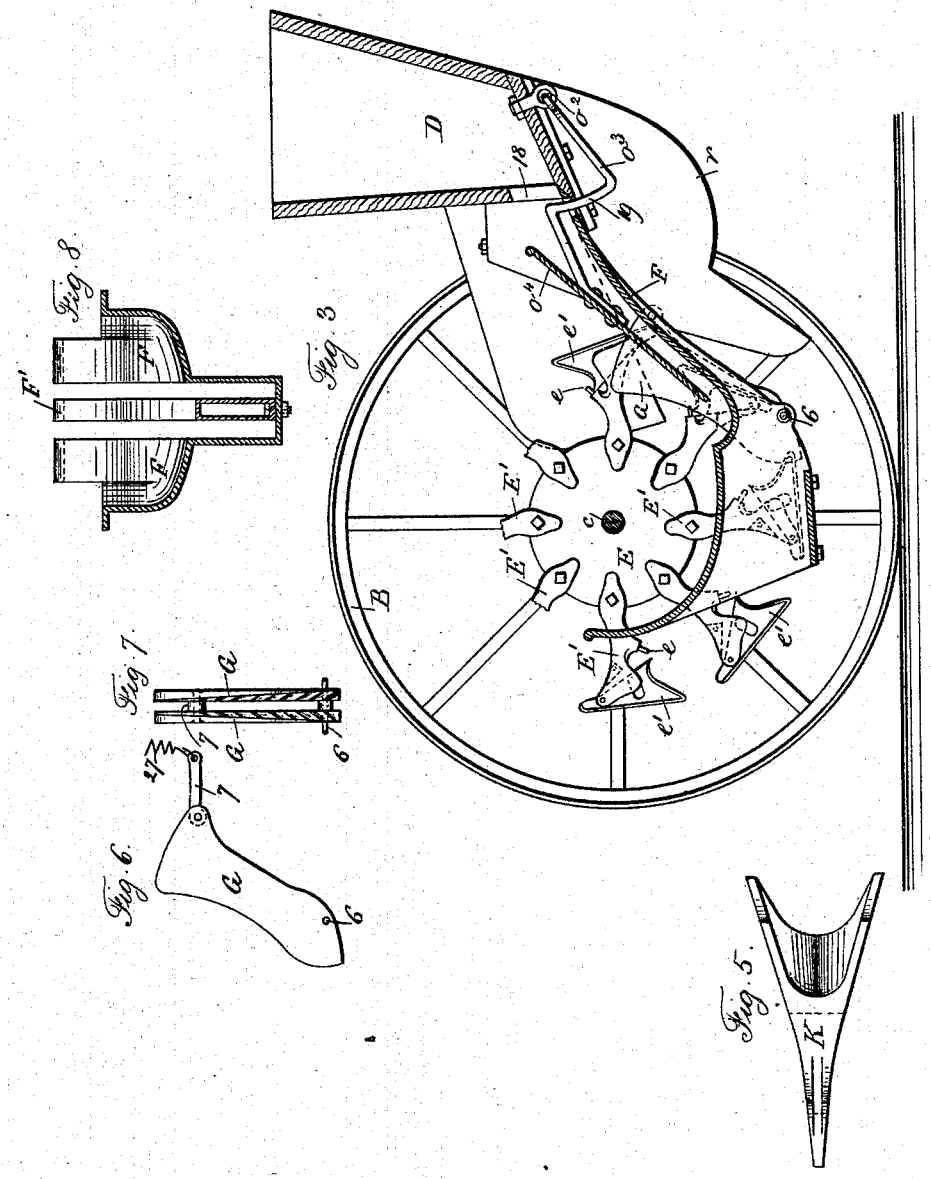
Witnesses
J. Staib
Chs. H. Smith
Inventor
Lewis Augustus Aspinwall
per Lemuel W. Serrell, atty

UNITED STATES PATENT OFFICE.

L. AUGUSTUS ASPINWALL, OF TRENTON, NEW JERSEY.

POTATO-PLANTER.

SPECIFICATION forming part of Letters Patent No. 276,994, dated May 8, 1883.

Application filed August 31, 1882. (No model.)

*To all whom it may concern:*

Be it known that I, LEWIS AUGUSTUS ASPINWALL, of Trenton, in the State of New Jersey, have invented an Improvement in Potato-Planters, of which the following is a specification.

The present invention is a modification of and improvement upon the device for which Letters Patent No. 235,401 were granted to me December 14, 1880.

So far as the parts of the present potato-planter correspond with those in the aforesaid patent, I hereby refer to the same for a more full description.

In the drawings, Figure 1 is a plan view. Fig. 2 is a vertical central section. Fig. 3 is a vertical section through the potato-hopper. Fig. 4 is a cross-section at the line $x\,x$, Fig. 2. Fig. 5 is a detached plan of the plow. Fig. 6 is a side view; Fig. 7, an edge view of the concaves. Fig. 8 is a section of the iron frame. Fig. 9 is a section of the plow-lifting bar, handle, and pole. Fig. 10 is an elevation of the marker-arm. Fig. 11 is a plan, and Fig. 12 a view from the rear of the joint for the marker-arm.

The main frame A is of metal. It extends forward, and is provided with a socket for the reception of the pole or tongue A'.

The axle $c$ is in bearings on the frame A, and it receives the wheels B. There is also a clutch, I, the same as in my aforesaid patent.

The plow K is fastened to the frame M, said frame being pivoted at $m$ to the frame A. The plow is shown in plan view in Fig. 5, and it is provided with a suspending-bar, $h$, that passes through the rear end of the tongue A', and there is a tripper, $h^2$, that is united to the bar $h$ by a bolt, and is free to swing thereon. The lower end of the tripper rests upon the upper surface of the tongue and holds the plow up from the earth in going to the field or in turning around on the headland. There is a handle at the upper end of the tripper, by which it and the bar and plow can be raised by the driver. When the plow is to be lowered to its working position, the driver pushes the tripper over with his foot, and the plow descends the required distance, but no more, as the tripper, when lying upon its edge on the tongue, allows the pivot-bolt to be lower down than it is when the tripper is standing up on end.

The markers that have heretofore been employed with planters have stood up in front of the driver when not in use. This is very inconvenient, as it is in the way, and also prevents the horses being clearly seen and the animals guided. To avoid this difficulty I employ the arm $l^2$, which is fastened to the socket 10, having a hinge-pin passing also through the clip-piece 13, so that the arm swings thereon. There is a toe, 11, that projects from one side of the socket 10, and there is a standard, 14, and catch 12, hinged thereon. When this marker-arm is not being used it is turned up at an inclination, (see Fig. 12,) at which time the swinging catch 12 receives and holds the toe 11 in place. This catch 12 has inclined faces, so that it is pushed back by the toe as the marker-arm is turned up, and the catch 12 then swings forward and holds the toe and marker-arm. A weight, $l^4$, is fastened to the arm $l^2$, so as to press the marker into the earth sufficiently, and the marker $l^3$ may be moved to any desired position on the arm, so as to increase or decrease the width between the rows as marked off for planting.

The coverers H are upon arms that extend down from the frame M, as in aforesaid patent.

The dish E upon the shaft $c$ and the picker-arms E' upon such are similar to those in said patent. There may be either one spear, $e$, or two, and the hinged deliverers $e'$ act to crowd the pieces of potatoes toward the spears, so that such pieces may be lifted up and carried to the place of delivery, where the hinged pieces $e'$ are moved by the stationary roller $f$ and deliver the potato off the spears.

The lower and forward part of the hopper is rounded, as shown in Figs. 3 and 8, and there is a central segment, F', and a space between the parts, as shown in Figs. 1 and 8, for the arms E' to pass along and rise up through the mass of potatoes and pieces in the hopper as the spears stab, lift, and carry over the pieces and deliver the same in front of the hopper.

The concaves G are made in pairs, with their opposite faces wider at the lower end than at the upper end, as seen in Fig. 7, and these opposite faces are grooved inwardly and upwardly, so that the tendency of a potato or piece of potato as it is lifted by the picker-arm will be to run back into the narrower part between the concaves, and thus offer sufficient resistance to insure the sticking of the spear into the potato. With this exception the concaves are similar to those in my aforesaid patent.

Each pair of concaves is hinged at 6, at the lower end, and provided with a lever-arm, 7, extending from the upper end to the spring 27, which yields and allows the concaves to move back if the potatoes crowd too tightly in between the concaves.

The hopper D for the potatoes is made in two parts, having two openings at 18 for the potatoes to pass out of D and roll down into hopper F.

One of the present improvements relates to a device for keeping back the potatoes in the hopper D and preventing too great an accumulation in the hopper F. At $o^2$, below the hopper D, is a link-joint or pivot for the arm $o^3$. This arm has a bend or offset at 19, that passes up through the bottom of the hopper, just in front of the opening 18, and $o^4$ is a hand or plate of sheet metal or wood, fastened to the arm, and having an inclination corresponding, or nearly so, to that of the bottom of the hopper F, but at some little distance above it. As the potatoes pass out from the hopper D they roll or slide in between the hopper and the hand, and as the pieces shake down toward the lowest part of the hopper F the hand is raised by the accumulation of the potatoes beneath it, and in so doing the offset 19 in the arm $o^3$ is raised up in front of the opening 18; hence the potatoes are kept back in the hopper D until the quantity in the hopper F has been sufficiently consumed to allow the hand to descend.

I make use of a hopper, N, for containing fertilizing material—such as guano, bone-dust, or phosphates—which are scattered upon the potatoes in the furrow or trench just before the coverers scrape the earth together. The same means may be applied in the sowing of peas, beans, grain, or other material, so that the one machine is available for other uses besides the planting of potatoes, such as grain in drills, &c. The bottom end of this hopper N is curved, as seen at $r$, and there is a spout, $r'$, leading downwardly from $r$. In the hopper is an opening at 30, and a regulator, $s$, is in front of this opening. The regulator is pivoted at 31, (see Fig. 4,) and it can be raised or lowered at the other end by the action of a screw, 32, which also holds it firmly in any position to which the regulator is adjusted. In this regulator is a notch which comes in front of the opening 30. This notch is preferably V-shaped and of a size adapted to the fertilizer or other material made use of. The rock-shaft $t$ is in front of the hopper N. It passes beneath the hopper F, and is supported by bearings upon the same, or upon the frame A. At the outer end of the rock-shaft there is an arm, 40, acted upon by the cam $u$ in one direction, and by the spring 42 in the other direction, and at the inner end this rock-shaft is provided with an arm and a segmental agitator, $v$, having cross-fingers $v'$. This agitator occupies the opening in the notched regulator, and when this agitator remains quiescent the cross-fingers detain the material in the hopper and cause it to bank up in the concave lower end of the hopper at the opening of the regulator, so that the contents of the hopper will not flow down until the agitator receives a motion, the same swinging in the arc of a circle, and causing more or less of the material to be drawn out and delivered, according to the extent of motion given to the rock-shaft $t$ by the cam $u$. To effect this object a limiting-screw is applied to determine the amount of movement of the lever-arm 40 and its roller toward the recessed portions of the cam $u$. By this means the agitator can be made to draw out of the bottom of the hopper, and deliver more or less of fertilizer or seeds at each reciprocation.

To prevent the fertilizer or other material remaining against the sides of the upper part of the hopper, I connect with the upper end of the agitator the loose stirrer $w$ by a link-joint, so that the stirrer may move about from side to side of the hopper, and there are pins therein, which serve to stir the mass in the hopper, and cause it to fall down regularly to the bottom of the hopper. This stirrer, being upon the end of the reciprocating agitator, has an up-and-down motion, and I prefer to place two cross-bars at 45, to limit the lateral motion of the upper end, as it may fall in one direction or the other.

I claim as my invention—

1. The combination, with the plow K, of the bar $h$ and the tripper $h^2$, having a lifting-handle and pivoted to the link, as and for the purposes set forth.

2. The combination, with the potato-planting devices, of the tongue A′, the marker $l^3$, marker-arm $l^2$, hinge 10, toe 11 upon one side of the socket for the arm, and the hinged catch 12, substantially as set forth.

3. The combination, with the revolving arms and spears, of the concaves G, having inclined faces that are narrowest at the upper ends, and corrugations or grooves inclined inwardly and upwardly, substantially as set forth.

4. The combination, with the hopper for containing potatoes, of the hinged arm having an offset near the exit of the potatoes from the hopper, and the hand or float $o^4$, substantially as set forth.

5. In combination with a hopper for containing the material to be sown, a rock-shaft and mechanism, substantially as specified, for moving the same, an agitator formed as an arc of a circle, with teeth supported and moved by such rock-shaft and entering the delivery-spout of the hopper, substantially as specified.

6. In combination with a hopper for seeds or manure, the cut-off $s$, the rock-shaft, means for moving the same, the segmental agitator, and the loose stirrer jointed to the agitator, substantially as set forth.

Signed by me this 22d day of August, A. D. 1882.

L. AUGS. ASPINWALL.

Witnesses:
WILLIAM G. MOTT,
HAROLD SERRELL.